G. A. LYON.
RESILIENT BUFFER.
APPLICATION FILED FEB. 24, 1920. RENEWED FEB. 8, 1922.
1,423,573.  Patented July 25, 1922.
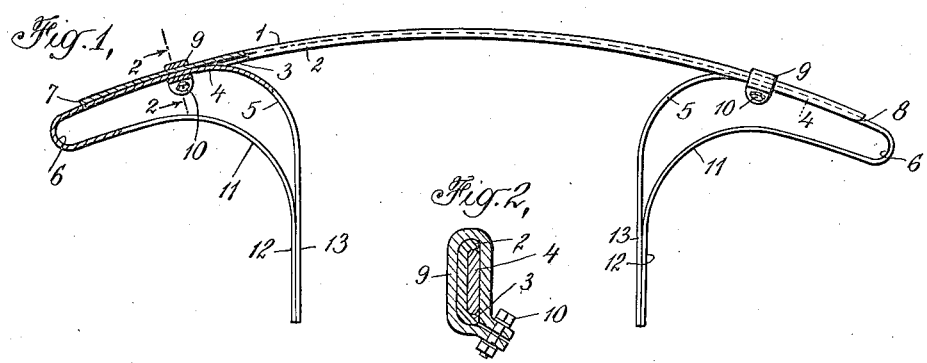
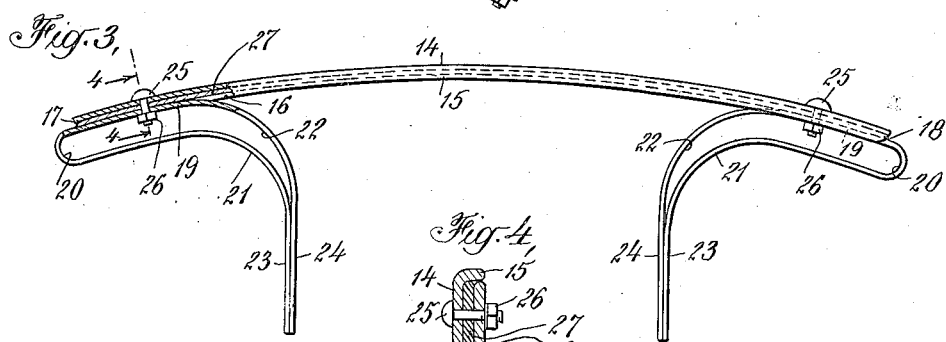
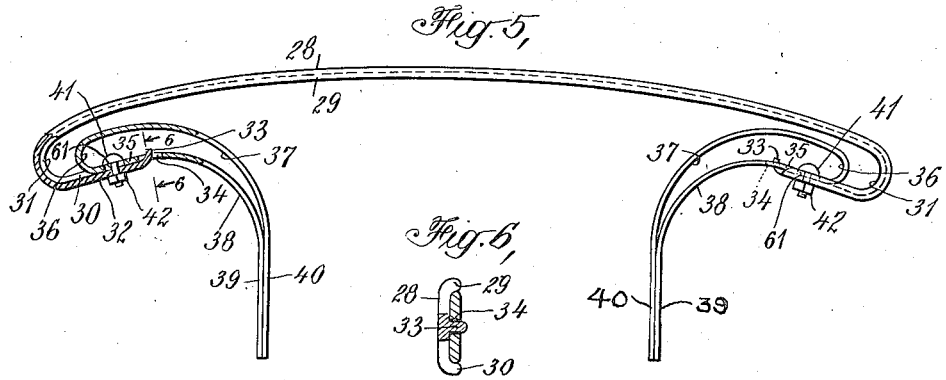
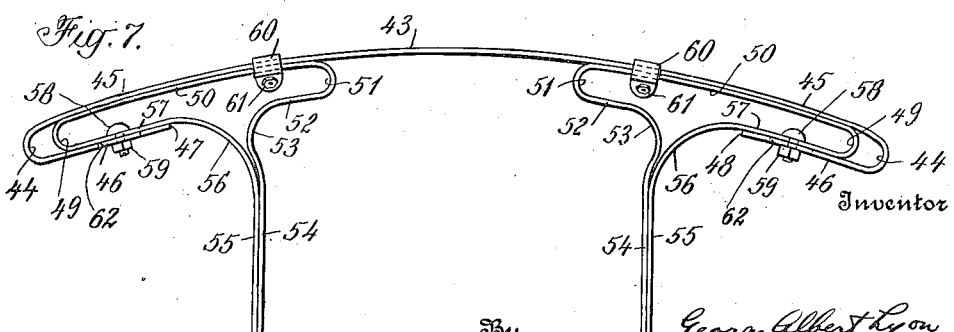
Inventor
George Albert Lyon
By Harry L. Duncan  Attorney

UNITED STATES PATENT OFFICE.

GEORGE ALBERT LYON, OF PHILADELPHIA, PENNSYLVANIA.

RESILIENT BUFFER.

1,423,573. Specification of Letters Patent. Patented July 25, 1922.

Application filed February 24, 1920, Serial No. 360,585. Renewed February 8, 1922. Serial No. 535,095.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Resilient Buffers, of which the following is a specification, taken in connection with the accompanying drawing.

This invention relates especially to resilient buffers for automobiles or other vehicles in which looped buffer ends may be produced by outwardly projecting looped end attaching or buffer front members or both. The attaching members or elements may be formed of spring steel or other resilient strip material and may, in some cases, if desired, comprise duplex or closely spaced attaching portions adapted to be clamped or secured to the automobile frame members. These attaching elements may also preferably comprise outwardly and rearwardly extending end loops which may, in some cases, form the buffer ends and be formed with adjacent connector portions on either or both sides of these end loops, these connector portions being in some instances substantially straight to facilitate the adjustment of the parts. The intermediate portions of these attaching elements may be curved so as to promote their resilient yielding action and may advantageously in some cases be given a gradually separating or diverging character from or adjacent the attaching portions to or toward their loop end or connector portions. The buffer front member, which is preferably, though not necessarily, of resilient or spring steel material may, in some cases, be formed with aligning elements such as one or more edge flanges cooperating with the connector portions of the attaching elements and clamped or connected thereto as by enclosing clamping devices or clips which may be advantageously arranged in some cases substantially in line with the attaching elements. This buffer front member which may be of spring channel construction with or without one or more reenforcing strips or members, where it is desired to form a multiple thickness buffer front, preferably extends to or adjacent the buffer ends and may in some cases be formed with looped ends more or less enclosing the looped end or connector portions of the attaching elements.

In the accompanying drawing showing in a somewhat diagrammatic way illustrative embodiments of this invention, Fig. 1 is a plan view partly in section showing one form of buffer.

Fig. 2 is an enlarged transverse section thereof taken substantially along the line 2—2 of Fig. 1.

Fig. 3 is a plan view showing another illustrative buffer.

Fig. 4 is a transverse enlarged section thereof taken along the line 4—4 of Fig. 3.

Fig. 5 is a plan view of another illustrative buffer.

Fig. 6 is a transverse enlarged section thereof taken along the line 6—6 of Fig. 5; and Fig. 7 is a plan view of still another illustrative buffer.

The attaching elements which may advantageously be formed of tempered spring steel strip two inches or so wide in a vertical direction and a quarter to three-eighths inches thick more or less may, as indicated, in Fig. 1 be advantageously formed with duplex or closely spaced attaching portions 12, 13, although it is not necessary in all cases to have both these attaching ends extend equally toward the frame or other portion of the vehicle to which they are bolted, clamped or otherwise secured in any suitable way. The attaching elements are preferably formed with end loops 6 which extend outwardly and rearwardly in a front autotmobile buffer in connection with which the invention is for convenience and clearness described and claimed although it is of course understood that these buffers may be used as rear buffers on automobiles or other vehicles in which case the attached buffer ends might extend outward and forward as they are applied to the vehicle. The attaching elements preferably have substantially straight connector portions 4 adjacent the looped ends 6 and intermediate curved resilient portions 5, 11 promote the resilient yielding action of this part of the buffer so as to increase its impact absorbing or cushioning action.

The cooperating buffer front member 1 may as indicated be advantageously forwardly bowed and formed of spring channel having the flanges 2, 3, adapted to cooperate with the edges of the connector portions 4 of the attaching members and have substantial aligning action in connection therewith so that when the parts fit reasonably tightly at these points as indicated in Fig. 2 the vertical rigidity and alignment of the buffer elements is considerably promoted. This buffer frame member may extend outward to its desired extent after engaging the connector portions of the attaching elements and in some cases the buffer front may be formed with ends 7, 8, preferably extending adjacent the ends of the buffer which are advantageously of looped form in most cases and these parts may be adjustably or otherwise connected in any suitable way as by enclosing clamping devices or clips 9, arranged upon or around the parts and detachably and rigidly connecting them when the bolts 10 are tightened.

Fig. 3 shows another illustrative arrangement in which the attaching elements may be formed with duplex closely spaced attaching ends or portions 23, 24 and with outwardly extending end loops 20, which may in some cases be bent or extended rearwardly as indicated. If desired, these attaching elements may be formed adjacent their end loops with substantially straight or uniformly curved connector portions 19, while the intermediate curved resilient portions 21, 22 may gradually separate or diverge from or adjacent the attaching portions toward the connector portions of the elements. The buffer front may be of multiple thickness construction comprising the desired number of tempered spring steel or other strips preferably of a resilient character and as indicated the front strip 14 may be of spring channel construction having the flanges 15, 16 enclosing and more or less aligning the connector portions 19 of the attaching elements and also if desired one or more interposed reenforcing strips or members 27. In this way the channeled buffer front member may conceal the cooperating strips or connector portions so as to improve the appearance of the buffer and also give ample stiffness and resilient strength to this front portion thereof which may have ends 17, 18 extending to or adjacent the buffer ends. These parts may be adjustably or otherwise connected in any suitable way as by connecting bolts 25, which may have rounded projecting heads on the buffer front while the nuts 26 may be arranged and more or less concealed within the loop ends of the attaching members.

As shown in Fig. 5 attaching members of generally similar resilient strip construction may comprise the attaching ends 39, 40 and the gradually separating resilient intermediate portions 37, 38, so that the looped end 36 of each of these attaching members is amply separated to give increased resilience to this part which may be located adjacent the buffer end. The cooperating buffer front member 28 is illustrated as being of spring channel construction comprising the relatively narrow edge flanges 29, 30 and, if desired, having the end loops 31 arranged to form the ends of the buffer and more or less enclose the ends of the cooperating attaching elements. These attaching elements may have substantially straight connector portions 35 engaging and cooperating with the connector portions 32 on the ends of the buffer front member which may be formed with suitable aligning projections or portions in addition to the edge flanges on the front members in some cases. As indicated in Figs. 5 and 6 the inwardly extending ends or connector portions of the buffer front member may each be formed with a projecting aligning tip such as 33 extending through a slot or aperture 34 in the cooperating connector portion so as to exert a desirable aligning action between these parts which is especially valuable when neither of the parts is formed with aligning edge flanges. These parts may be adjustably connected in any suitable way as by the connecting bolts 41 which may project through holes or adjusting slots such as 61 in one or both of the cooperating connecting portions so as to allow the desired range of lateral adjustment of the attaching elements before the parts are clamped by screwing up the nuts 42.

Fig. 7 shows another illustrative arrangement in which the attaching members of spring steel or other strip material may have one or more attaching portions or ends 54, 55 to be clamped or secured to the automobile frame members while the outwardly extending looped end 49 may be of substantially uniform width throughout a considerable portion so as to form parallel connector portions 50, 57 on its opposite sides, if desired. This looped end connector portion may be connected to the attaching portion 55 by the curved resilient portion 56 of the strip which increases the resilient yield of the parts and if desired, the inner ends of the attaching element strip may be extended still further inward than is shown in Figs. 1 and 3, and may have an inwardly turned connector loop such as 51 joined by the curved portions 52, 53 to the attaching portion or end 54 of the strip. In this case the buffer front member which may be of spring strip construction may be forwardly and substantially uniformly arched or bowed so as to have a forwardly extending central portion 43 and similarly arched or bowed connector portions 45 terminating in the buffer end loops 44 while, if desired, a rear connector portion, such as 46 may be arranged substantially parallel to the forward connector portion 45 of this buffer front member. The inturned ends 47 of this buffer front member are thus located a considerable distance inside the end loops 44 so that extended connector portions are provided between these points to more securely engage and support the cooperating connector portions of the attaching elements which may be moved or forced into the desired adjusted position when the buffer is assembled on an automobile or other vehicle and then securely clamped in adjusted position so that the desired strength and rigidity of the parts is ensured. For this purpose enclosing clamping devices or clips 60 may in some cases enclose these cooperating connector portions at any suitable points preferably substantially in line with the attaching portions to be connected to the automobile frame member. Also if desired additional clamping or connecting means may be employed such as the connecting bolts 58 extending through slots such as 62 in one or both of the connector portions so as to provide the desired range of adjustment before the nuts 59 are tightened. By forming these different types of buffer with substantially similar spring strip attaching elements their convenient and close packing is promoted, especially with such forms of attaching elements as in the Fig. 5 construction. These duplex attaching portions or ends also give increased strength and stiffness to this part of the buffer and minimize the chances of breakage or failure under collision conditions.

This invention has been described in connection with a number of embodiments, forms, proportions, parts, arrangements, materials, methods of connection and use, to the details of which disclosure the invention is not of course to be limited, since what is claimed as new and what is desired to be secured by Letters Patent is set forth in the appended claims:

1. The resilient automobile buffer comprising two substantially similar spring strip end loop attaching elements, each having closely spaced duplex attaching portions adapted to be secured to an automobile frame member and having an outwardly and rearwardly extending buffer end loop and an adjacent substantially straight connector portion and intermediate gradually separating curved resilient portions, and a forwardly bowed spring channel buffer front member having flanges cooperating with the edges of the connector portions of said attaching elements and adapted to extend adjacent the buffer ends and enclosing clamping devices adjustably connecting said buffer front member with said attaching elements.

2. The resilient automobile buffer comprising two substantially similar spring strip end loop attaching elements, each having closely spaced duplex attaching portions, adapted to be secured to an automobile frame member and having an outwardly and rearwardly extending buffer end loop and an adjacent connector portion and intermediate gradually separating curved resilient portions, and a spring channel buffer front member having flanges cooperating with the edges of the connector portions of said attaching elements and adapted to extend adjacent the buffer ends and clamping devices detachably connecting said buffer front member with said attaching elements.

3. The resilient automobile buffer comprising two substantially similar spring strip end loop attaching elements, each having an attaching portion adapted to be secured to an automobile frame member and having an outwardly and rearwardly extending buffer end loop and an adjacent connector portion and intermediate curved resilient portions, and a spring buffer front member cooperating with the connector portions of said attaching elements and adapted to extend adjacent the buffer ends and clamping devices detachably connecting said buffer front member with said attaching elements.

4. The resilient automobile buffer comprising two resilient strip end loop attaching elements, each having an attaching portion adapted to be secured to an automobile frame member and having an outwardly extending buffer end loop and an adjacent connector portion and intermediate outwardly curving gradually separating resilient portions, and a resilient buffer front member having aligning means cooperating with the connector portions of said attaching elements and adapted to extend adjacent said end loops and cooperating connecting devices detachably connecting said buffer front member with said attaching elements.

5. The resilient automobile buffer comprising two resilient strip end loop attaching elements, each having an attaching portion adapted to be secured to an automobile frame member and having an outwardly extending buffer end loop and an adjacent connector portion and intermediate resilient portions, and a resilient buffer front member cooperating with the connector portions of said attaching elements and adapted to extend adjacent said end loops and cooperating connecting devices detachably connecting said buffer front member with said attaching elements.

6. The resilient automobile buffer having looped ends and comprising two substantially similar spring strip looped end attaching elements having duplex attaching portions adapted to be secured to an automobile frame member and each having a connector portion and an adjacent outwardly and rearwardly extending end loop adjacent the end of the buffer, and a cooperating multiple thickness resilient buffer front member having ends adapted to extend adjacent the ends of the buffer and connecting portions adjustably connected to the connecting portions of said attaching elements.

7. The resilient automobile buffer having looped ends and comprising two substantially similar spring strip looped end attaching elements having attaching portions adapted to be secured to an automobile frame member and each having a connector portion and an adjacent outwardly and rearwardly extending end loop adjacent the end of the buffer, and a cooperating multiple thickness resilient buffer member having ends adapted to extend adjacent the ends of the buffer and connecting portions connected to the connecting portions of said attaching elements.

8. The resilient automobile buffer comprising two substantially similar spring strip looped end attaching elements having attaching portions adapted to be secured to an automobile frame member and each having a connector portion and an adjacent outwardly and rearwardly extending end loop adjacent the end of the buffer, and a cooperating buffer front member having ends adapted to extend adjacent the ends of the buffer and connecting portions connected to the connecting portions of said attaching elements.

9. The resilient automobile buffer having looped ends and comprising two substantially similar resilient strip looped end attaching elements each having an attaching portion adapted to be secured to an automobile frame member and having a connector portion and having an adjacent outwardly and rearwardly extending end loop adjacent the end of the buffer, a cooperating buffer front member having ends adapted to extend adjacent the ends of the buffer and connecting portions adjustably cooperating with the connecting portions of said attaching elements, and clamping devices enclosing said cooperating connecting portions and spaced about the same distance apart as said attaching portions.

10. The resilient automobile buffer comprising two substantially similar resilient strip looped end attaching elements each having an attaching portion adapted to be secured to an automobile frame member and having a connector portion and having an adjacent outwardly extending end loop adjacent the end of the buffer, a cooperating buffer front member having ends adapted to extend adjacent the ends of the buffer and connecting portions adjustably cooperating with the connecting portions of said attaching elements, and clamping devices engaging said cooperating connecting portions and spaced about the same distance apart as said attaching portions.

11. The resilient automobile buffer comprising two resilient strip looped end attaching elements each having an attaching portion adapted to be secured to an automobile frame member and having a connector portion and having an outwardly extending end loop forming an end of the buffer, a cooperating buffer front member having connector portions connected with the connecting portions of said attaching elements.

12. The resilient automobile buffer comprising two substantially similar spring strip looped end attaching elements each having a duplex attaching portion adapted to be secured to an automobile frame member and having an outwardly extending end loop forming the end of the buffer, and having an inwardly turned loop extending considerably inward from said attaching portions, and a cooperating buffer front member adjustably connected to the front connecting portions of said attaching elements.

13. The resilient automobile buffer comprising two spring strip looped end attaching elements each having an attaching portion adapted to be secured to an automobile frame member and having an outwardly extending end loop forming the end of the buffer, and having an inwardly turned loop extending considerably inward from said attaching portions, and a cooperating buffer front member connected to said attaching elements.

14. The resilient automobile buffer comprising two spring strip end loop attaching elements, each having an attaching portion adapted to be secured to an automobile frame member and having an outwardly and rearwardly extending end loop forming the end of the buffer, and a buffer front member connected to said attaching elements.

GEORGE ALBERT LYON.